(12) United States Patent
Mart

(10) Patent No.: US 10,240,478 B2
(45) Date of Patent: Mar. 26, 2019

(54) TURBINE WITH VARIABLE INLET CROSS-SECTIONAL AREA

(71) Applicant: BorgWarner Inc., Auburn Hills, MI (US)

(72) Inventor: Verschoor Mart, Rijnsburg (NL)

(73) Assignee: BorgWarner Inc., Auburn Hills, MI (US)

( * ) Notice: Subject to any disclaimer, the term of this patent is extended or adjusted under 35 U.S.C. 154(b) by 369 days.

(21) Appl. No.: 15/031,905

(22) PCT Filed: Oct. 29, 2014

(86) PCT No.: PCT/US2014/062762
§ 371 (c)(1),
(2) Date: Apr. 25, 2016

(87) PCT Pub. No.: WO2015/066102
PCT Pub. Date: May 7, 2015

(65) Prior Publication Data
US 2016/0265425 A1     Sep. 15, 2016

(30) Foreign Application Priority Data
Oct. 30, 2013   (DE) .................. 10 2013 222 104

(51) Int. Cl.
*F01D 17/14*     (2006.01)
*F02B 37/22*     (2006.01)
(Continued)

(52) U.S. Cl.
CPC ......... *F01D 17/148* (2013.01); *F01D 17/105* (2013.01); *F01D 17/143* (2013.01);
(Continued)

(58) Field of Classification Search
CPC .......... F02B 37/18; F02B 37/22; F01D 17/05; F01D 17/141; F01D 17/146; F01D 17/148; F05D 2250/51; F05D 2250/90
See application file for complete search history.

(56) References Cited

U.S. PATENT DOCUMENTS 4,729,715 A * 3/1988 Wilde .................. F01D 17/146
                                                                415/150
8,281,588 B2 * 10/2012 Garrett ...................... F01D 1/06
                                                                123/562
(Continued)

FOREIGN PATENT DOCUMENTS

DE       102010054914 A1    6/2012
EP            2025880 A2    2/2009
(Continued)

OTHER PUBLICATIONS

International Search Report and Written Opinion in International Application No. PCT/US2014/062762 dated Feb. 4, 2015.
(Continued)

*Primary Examiner* — Ninh H. Nguyen
(74) *Attorney, Agent, or Firm* — Eric L. Doyle; Stephan A. Pendorf; Patent Central LLC

(57) ABSTRACT

A turbine 28 for an exhaust-gas turbocharger, having a turbine housing 2, a drum 11 arranged in the turbine housing 2 and rotatable about an axis of rotation 12, a turbine wheel 5 arranged rotatably in the drum 11, at least one volute 16, 17 formed in the turbine housing 2, at least one aperture 14, formed in the drum 11, for conducting a gas flow from the at least one volute 16, 17 to the turbine wheel 5, an inlet cross-sectional area Av of the volute 16, 17 being variable by changing an angle of rotation v of the drum 11 relative to the turbine housing 2, and the drum being mounted in the turbine housing 2 by way of bearing elements 19.

10 Claims, 7 Drawing Sheets

(51) Int. Cl.
*F02B 37/18* (2006.01)
*F01D 17/10* (2006.01)
*F02B 37/24* (2006.01)
*F04D 17/10* (2006.01)
*F04D 29/42* (2006.01)

(52) U.S. Cl.
CPC ............ *F01D 17/146* (2013.01); *F02B 37/18* (2013.01); *F02B 37/22* (2013.01); *F02B 37/24* (2013.01); *F04D 17/10* (2013.01); *F04D 29/4206* (2013.01); *F05D 2220/40* (2013.01); *F05D 2250/51* (2013.01); *F05D 2250/90* (2013.01); *Y02T 10/144* (2013.01)

(56) References Cited

U.S. PATENT DOCUMENTS

| | | | | |
|---|---|---|---|---|
| 8,585,353 | B2* | 11/2013 | Arnold | F01D 17/141 415/128 |
| 9,771,942 | B2* | 9/2017 | Faeth | F04D 27/002 |
| 2004/0109760 | A1 | 6/2004 | Jones | |
| 2011/0052374 | A1* | 3/2011 | Arnold | F01D 17/141 415/148 |
| 2011/0067397 | A1 | 3/2011 | Hirth et al. | |
| 2013/0164157 | A1 | 6/2013 | Roberts et al. | |
| 2015/0093236 | A1 | 4/2015 | Faeth et al. | |

FOREIGN PATENT DOCUMENTS

| | | |
|---|---|---|
| FR | 2950105 A1 | 3/2011 |
| JP | 2008240593 A | 10/2008 |
| JP | 2013124649 A | 6/2013 |
| WO | 2012062407 A1 | 5/2012 |
| WO | 2013127664 A1 | 9/2013 |

OTHER PUBLICATIONS

Chinese Office Action (with English language translation) dated Jan. 10, 2018, in Chinese Application No. 201480057100.6.

* cited by examiner

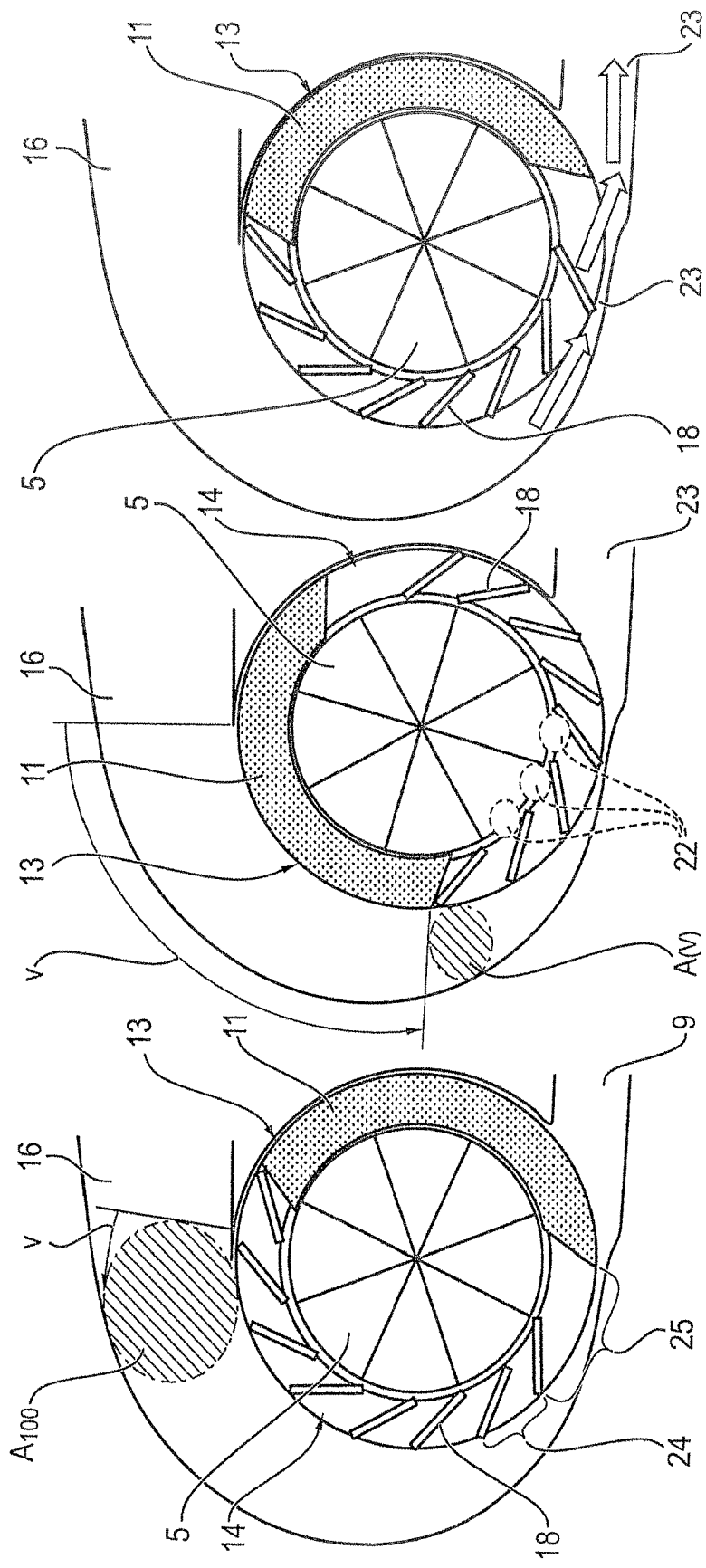

TURBINE WITH VARIABLE INLET CROSS-SECTIONAL AREA

BACKGROUND OF THE INVENTION

Field of the Invention

The invention relates to an adjustable turbine, in particular to a turbine having a variable flow inlet cross section.

Description of the Related Art

Adjustable turbines are known which have a multiplicity of guide vanes which are pivotable about their own respective axes, such that the turbine wheel can be impinged on by flow in a manner dependent on an available exhaust-gas volume flow rate. Even though very good results can be achieved by this, such turbines with adjustable guide vanes are cumbersome to produce, and accordingly expensive, owing to a high number of parts that move relative to one another.

DE 25 39 711 A1 has disclosed a spiral housing for a turbomachine, in particular an exhaust-gas turbocharger. The spiral housing has a cross section that is adjustable at least in regions. Furthermore, in the spiral housing, a tongue is provided which is guided in sliding fashion and which is displaceable in a circumferential direction and by means of which the spiral inlet cross section can be varied.

It is an object of the present invention to provide an adjustable turbine which is easy to control and which is realized using simple means.

BRIEF SUMMARY OF THE INVENTION

This object is achieved by the features of claim 1. The dependent claims relate to preferred refinements of the invention.

Accordingly, a turbine for an exhaust-gas turbocharger is provided, the turbine having a turbine housing, a drum arranged in the turbine housing and rotatable about an axis of rotation, a turbine wheel arranged rotatably in the drum, at least one volute formed in the turbine housing, and at least one aperture, formed in the drum, for conducting a gas flow from the at least one volute to the turbine wheel. Here, an inlet cross-sectional area of the volute can be varied by changing an angle of rotation of the drum relative to the turbine housing, and the drum being mounted in the turbine housing by way of bearing elements.

By virtue of the fact that the drum is mounted in the turbine housing by way of bearing elements, said drum cannot become jammed in the turbine housing during operation, even in the presence of intense temperature fluctuations. The reliability and controllability of the turbine are simplified by way of this refinement, whereby series production is made possible. As bearing elements, use may be made of plain bearing elements or of roller bearing elements.

In one embodiment, guide vanes for guiding the gas flow to the turbine wheel are arranged in the aperture. The guide vanes serve to realize a flow that is directed toward the turbine wheel, whereby a torque that is output by the turbine can be increased.

In one refinement, it may be provided that, at at least one rotational angle of the drum, a bypass duct that issues into a turbine outlet is connected in fluid-conducting fashion, by a spacing between the guide vanes, to the volute (radial wastegate functionality). Accordingly, at particular operating points, the turbine can be bypassed, whereby the output power can be manipulated.

In an alternative or additional refinement, an axial wastegate bore is provided which is arranged in the drum and which, at one rotational angle of the drum, can be placed in overlap with a wastegate port (axial wastegate functionality). In this way, a bypass can be created between the turbine inlet and the turbine outlet.

In one advantageous refinement, two volutes are formed in the turbine housing. In this way, when the invention is used on an internal combustion engine, the exhaust gases from individual cylinders, or merged exhaust gases from multiple cylinders, can be conducted into one of the two volutes. It is self-evidently also possible for more than two volutes to be provided.

In one refinement, the bypasses at both volutes are opened simultaneously at the same rotational angle. In this way, exhaust gas can be partially or fully discharged when a maximum rotational speed or a maximum pressure is reached. Through the use of bores, it is possible, in a manner dependent on a degree of overlap of the wastegate port and the wastegate bore, for the discharged exhaust-gas stream to be finely adjusted by way of the rotational angle.

In an alternative embodiment, the bypasses (radial or axial wastegate functionality) of both volutes are configured such that, at particular rotational angles, only one of the volutes is connected in fluid-conducting fashion to the turbine outlet and such that, at a further rotational angle, both volutes are connected in fluid-conducting fashion to the turbine outlet. By means of this refinement, an additional degree of freedom is created for the control of the turbine in that, at certain operating points, the exhaust gas is discharged from the individual volutes in selective fashion.

In one refinement, an inner contour of the drum is designed correspondingly to an outer contour of the turbine wheel. Accordingly, the leakage of exhaust gas past the turbine can be kept low.

The adjustable turbine may also be used in a multi-stage supercharging system. Here, it may be advantageous if the volute can be completely closed by means of the drum in order to deactivate the turbine.

BRIEF DESCRIPTION OF THE SEVERAL VIEWS OF THE DRAWINGS

Further details, advantages and features of the present invention can be found in the following description of exemplary embodiments with reference to the drawing, in which:

FIGS. 8-10 show different positions of the drum in the turbine as per a third exemplary embodiment.

DETAILED DESCRIPTION OF THE INVENTION

Figure 1:
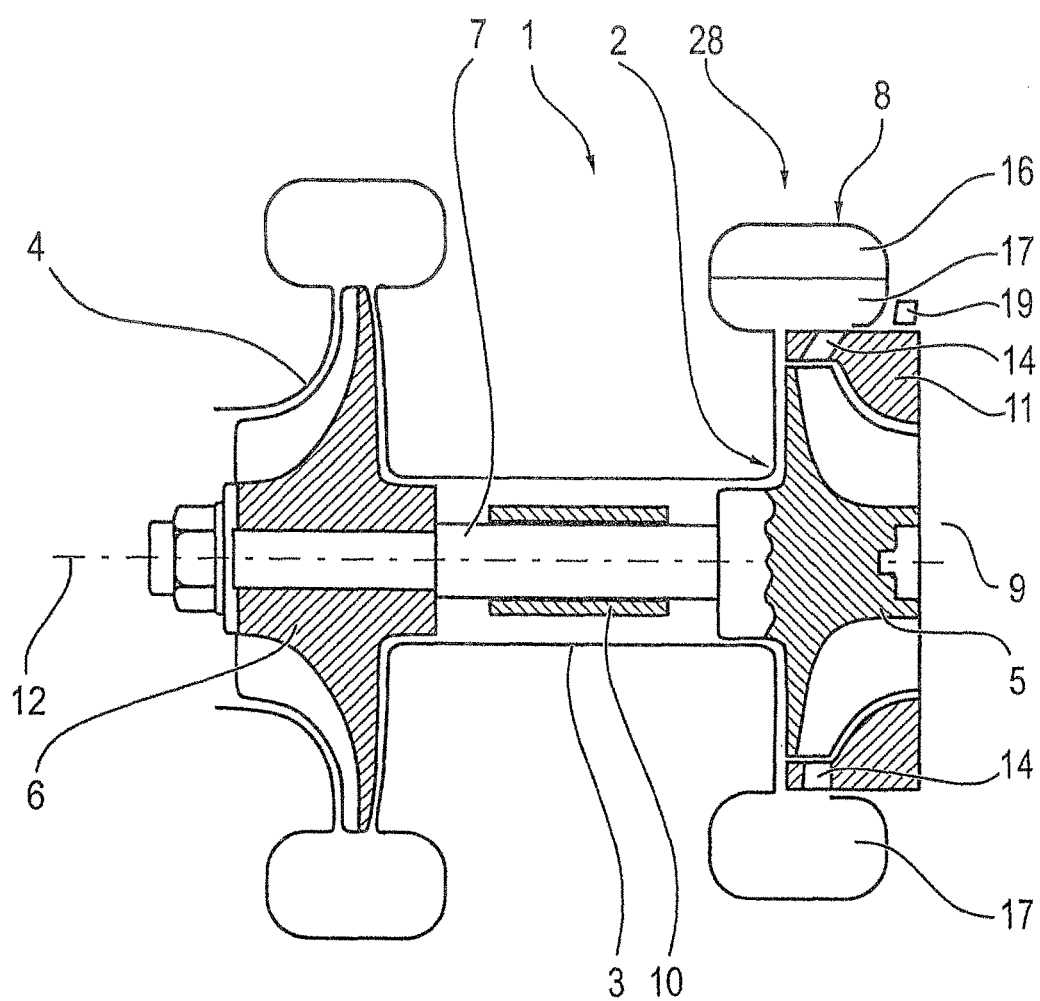
FIG. 1 shows a turbine according to the invention for an exhaust-gas turbocharger for all exemplary embodiments.

A number of exemplary embodiments of a turbine 28 in an exhaust-gas turbocharger 1 will be explained below on the basis of FIGS. 1 to 13. Here, the figures are of a schematic nature and show only those parts of the turbine 28 which are relevant to the invention. Identical or functionally identical components are denoted, in part, by the same reference numerals in the exemplary embodiments.

As per FIG. 1, the exhaust-gas turbocharger 1 comprises, for all exemplary embodiments, a turbine housing 2 of the turbine 28, a bearing housing 3, and a compressor housing 4. A turbine wheel 5 of the turbine 28 is arranged in the turbine housing 2. A compressor wheel 6 is arranged in the compressor housing 4. The turbine wheel 5 is connected rotationally conjointly to the compressor wheel 6 via a shaft 7. The shaft 7 is mounted in the bearing housing 3 by means of a shaft bearing 10. The shaft 7 extends along an axis 12.

A turbine inlet 8 is formed in the turbine housing 2. Said turbine inlet 8 is formed by two volutes 16, 17. Exhaust gas is conducted to the turbine wheel 5 via said two volutes 16, 17. The exhaust gas is conducted out of the turbine housing 2 via a turbine outlet 9. Owing to the two volutes 16, 17, the turbine housing 2 is in the form of a dual-flow housing.

During operation of the exhaust-gas turbocharger 1, a gas flow passes to the turbine wheel 5 via the two volutes 16, 17. In this way, the shaft 7 and the compressor wheel 6 are set in rotation. Here, the compressor wheel 6 may provide charge air for a combustion engine (not illustrated), in particular an internal combustion engine.

FIG. 1 also schematically shows a by means of schematically illustrated bearing elements 19 a drum 11 in the turbine 28, which drum is situated radially outside the turbine wheel 5 in the turbine housing 2. The drum 11 is mounted by means of the bearing elements 19 so as to be rotatable about the axis 12. Here, it is for example possible for three bearing elements 19 to be arranged in uniformly distributed fashion around the circumference of the drum 11. Here, the drum 11 is referred to as a drum merely owing to its cylindrical outer contour. Shapes deviating from a substantially cylindrical shape are also possible according to the present invention.

Figure 4:
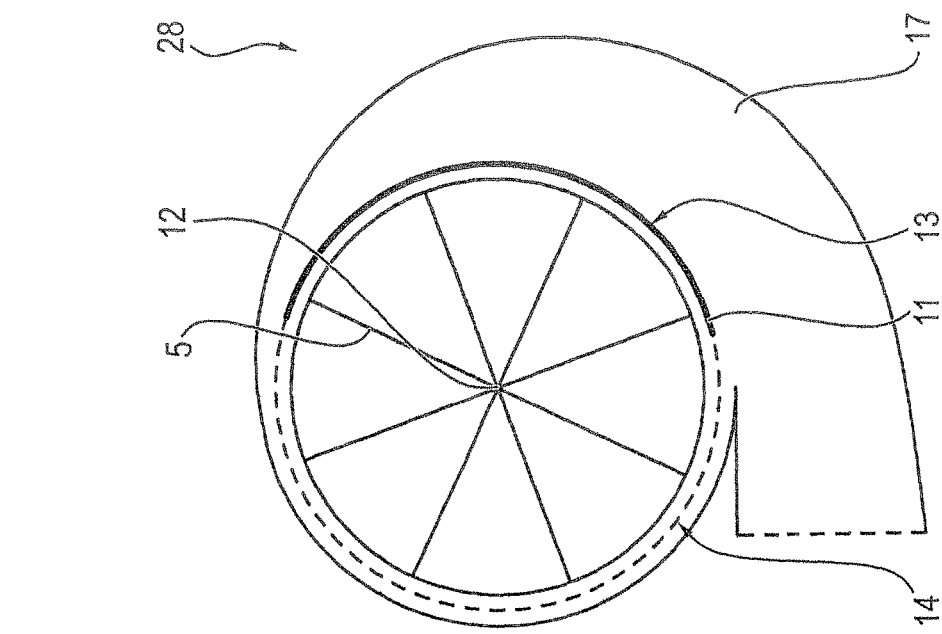
FIGS. 2-4 show the mode of operation of the turbine according to the invention as per a first exemplary embodiment.
Figure 3:
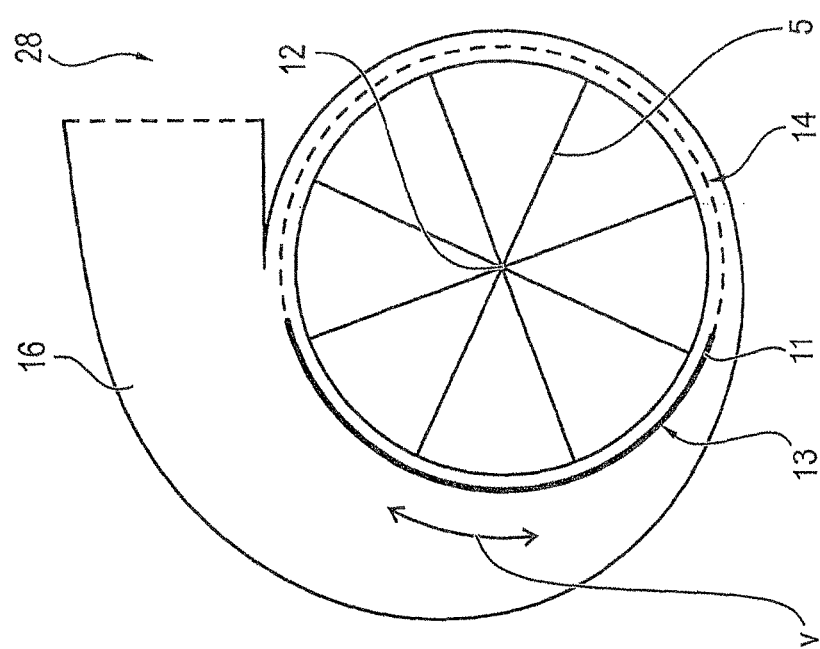
Figure 2:
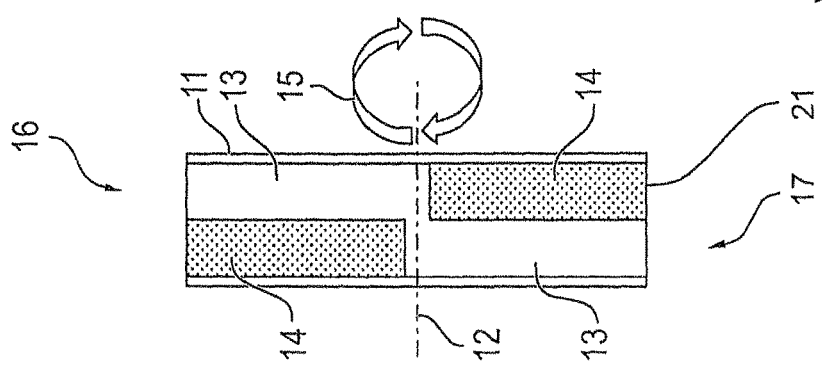

FIGS. 2 to 4 show, in a schematically simplified illustration, the design and mode of operation of the drum 11 in the first exemplary embodiment. The drum 11 has a closure surface 13 on its shell surface 21. Furthermore, an aperture 14 is formed in the shell surface 21.

FIG. 3 shows a section through the first volute 16 perpendicular to the axis 12. FIG. 4 shows a section through the second volute 17, likewise perpendicular to the axis 12. Here, the volutes 16, 17 are almost completely closed by the closure surface 13, and the turbine 28 is thus depicted in a deactivated position.

The drum 11 can be rotated through a rotational angle v, whereby the apertures 13 open up a larger area of the volutes 16, 17. As illustrated in FIGS. 3 and 4, it is also possible, in at least one position, for the volutes 16, 17 to be closed off for the purpose of completely shutting off the turbine 28.

Figure 5:
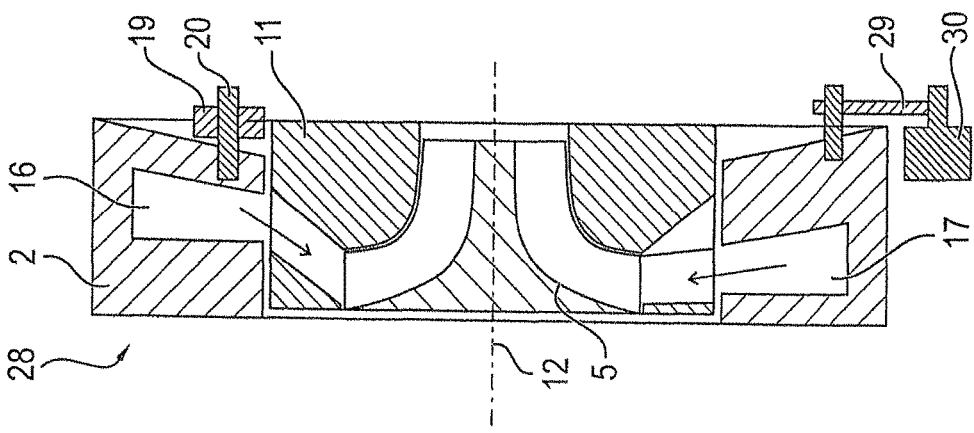
FIGS. 5-7 show the mode of operation of the turbine according to the invention as per a second exemplary embodiment.
Figure 6:
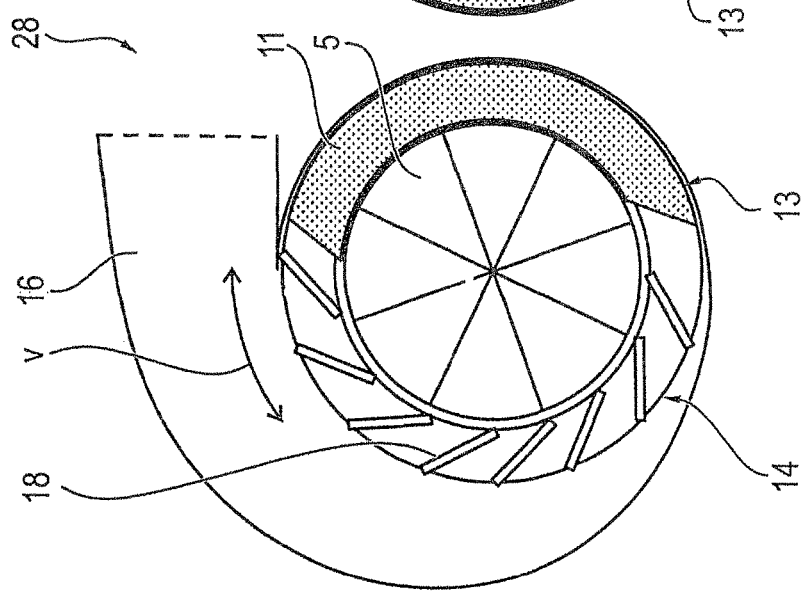
Figure 7:
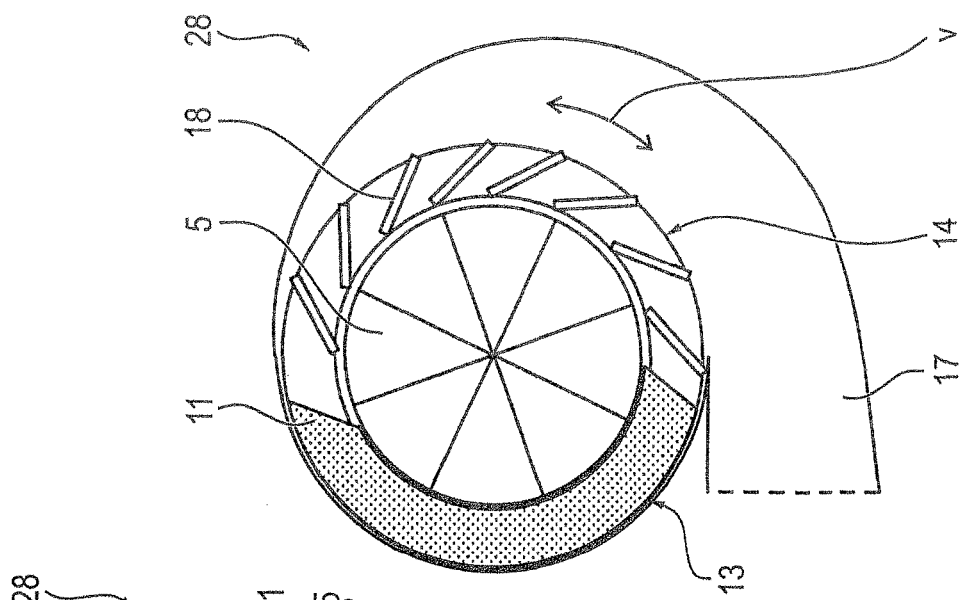

FIGS. 5 to 7 show, in a schematically simplified illustration, the design and mode of operation of the turbine 28 as per the second exemplary embodiment. In the second exemplary embodiment, multiple guide vanes 18 are arranged in the aperture 14. By way of said guide vanes 18, the exhaust gas is conducted to the turbine wheel 5 in optimized fashion in terms of flow.

Figure 11:
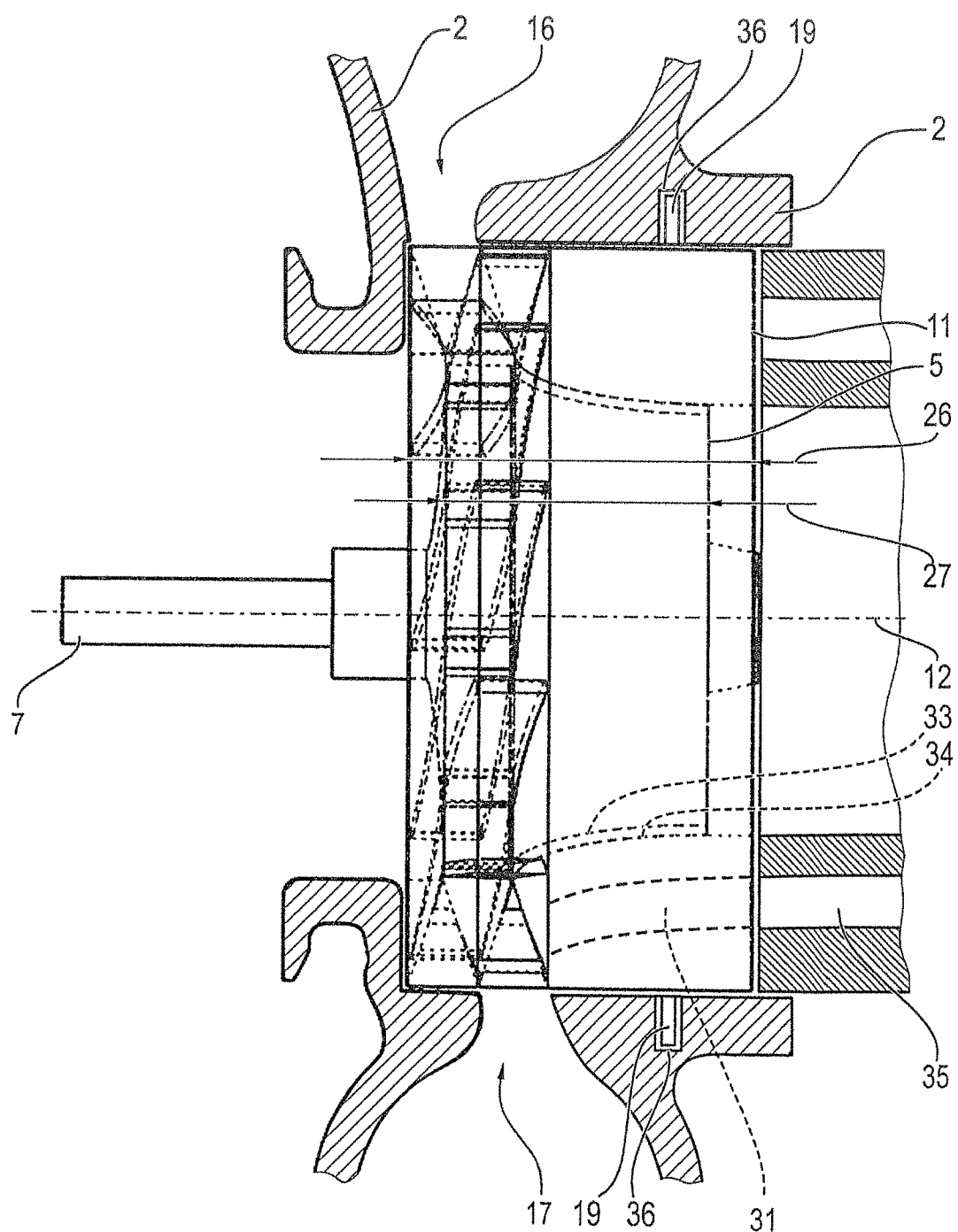
FIGS. 11-13 show possible design embodiments of a turbine.

The illustration in FIG. 5 also shows bearing elements 19 for the rotatable mounting of the drum 11. A similar or identical bearing arrangement may also be used in the first exemplary embodiment. The bearing elements 19 are in the form of rolling bodies and are connected rotatably to the turbine housing 2 by way of journals 20. The bearing elements 19 roll on the shell surface of the drum 11. Other arrangements of the bearing elements 19 themselves are possible in which journals 20 are not used, for example arrangements involving pockets 36 formed in the turbine housing 2, as illustrated in FIG. 11. Instead of separate pockets 36, it is also possible for one pocket 36 in the form of a groove, that is to say one pocket extending all the way around the circumference, to be provided for accommodating numerous bearing elements 19 arranged closely side-by-side.

For generating the rotational movement 15 of the drum 11, use is preferably made of an actuator 30, for example in the form of an electric motor or pneumatic control capsule, which, by way of a motion link arrangement 29, is designed to rotate the drum 11 and set particular rotational angles v.

FIGS. 6 and 7 show the fully open state of the two volutes 16, 17.

FIGS. 8 to 10 show different positions of the drum 11. Each of the figures shows the section through the first volute 16. At high rotational speeds, a greater inlet cross-sectional area A(v) can be opened up until the inlet cross-sectional area reaches a maximum value A100 that can be set, as illustrated in FIG. 8.

It can be seen that an inlet cross-sectional area A(v) varies with the rotational angle v; this also applies analogously to the other exemplary embodiments. In this way, a flow speed with which the gas flow impinges on the turbine wheel 5 changes, such that different operating points can be set in accordance with demand. In particular, in the presence of low volume flow rates, the inlet cross-sectional area A(v) can be kept small, such that the exhaust gas impinges at high speed on the turbine 5 and a high torque is generated, as illustrated in FIG. 9.

The guide vanes 18 have a first spacing 24 to one another. The final guide vane 18 as viewed in the flow direction has a second spacing 25 to the adjacent closure surface 13. The second spacing 25 is greater than the first spacing 24. Accordingly, the drum 11 can, as shown in FIG. 10, be positioned such that a bypass duct 23 that issues into the turbine outlet is connected in fluid-conducting fashion to the volute 16. Said bypass duct 23 constitutes a so-called "wastegate duct" which conducts the exhaust gas directly into the turbine outlet (see FIG. 1, reference sign 9), bypassing the turbine wheel 5. The positioning here is adjacent to the rotational angle (v) at which the inlet cross-sectional area A(v) is at a maximum (A100). Accordingly, when a maximum volume flow rate is reached, part of the volume flow can be discharged. In this way, both an adjustable turbine 28 and also finely controllable radial wastegate functionality are realized by means of a single component (specifically the rotatable drum).

Figure 12:
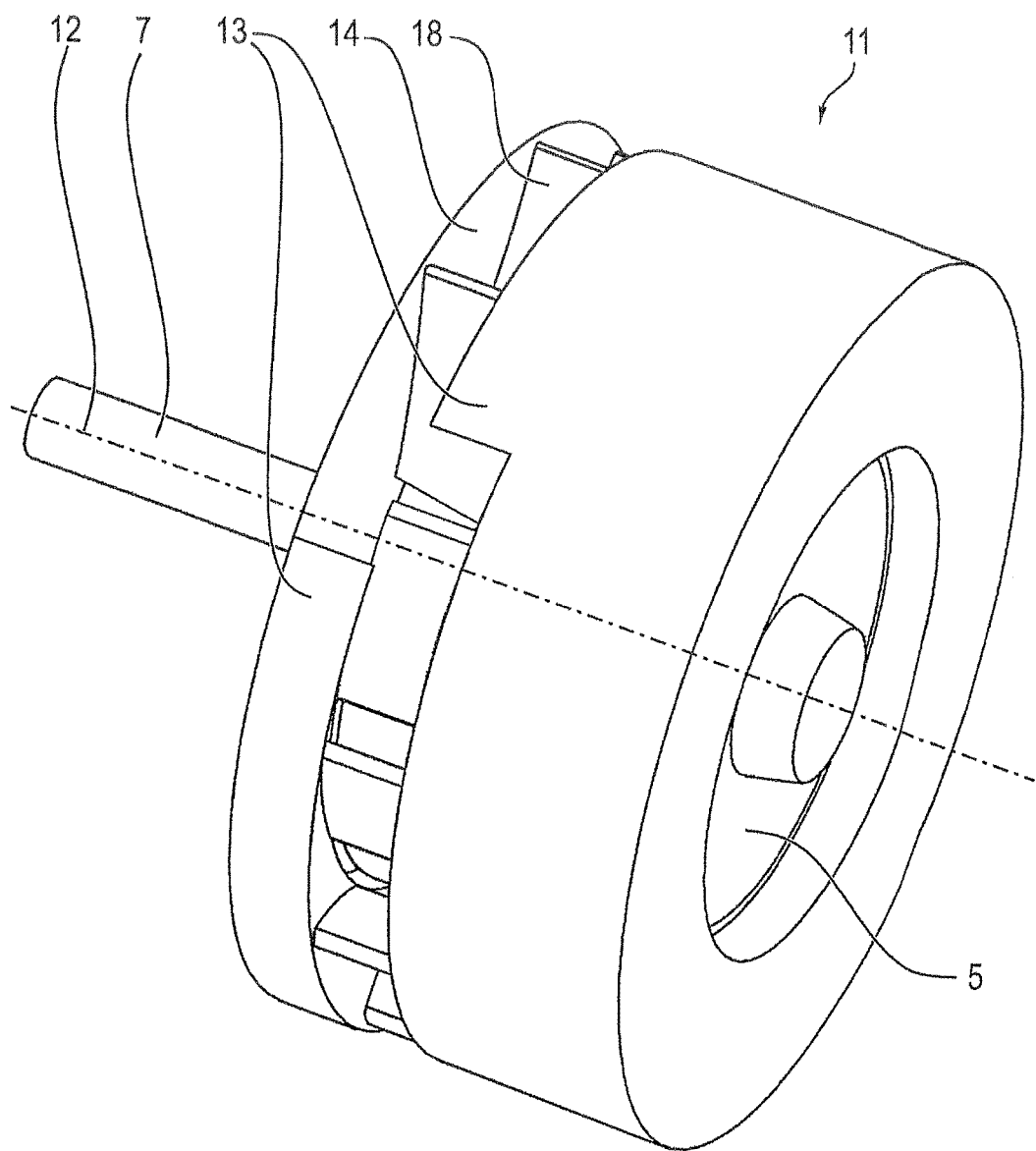
Figure 13:
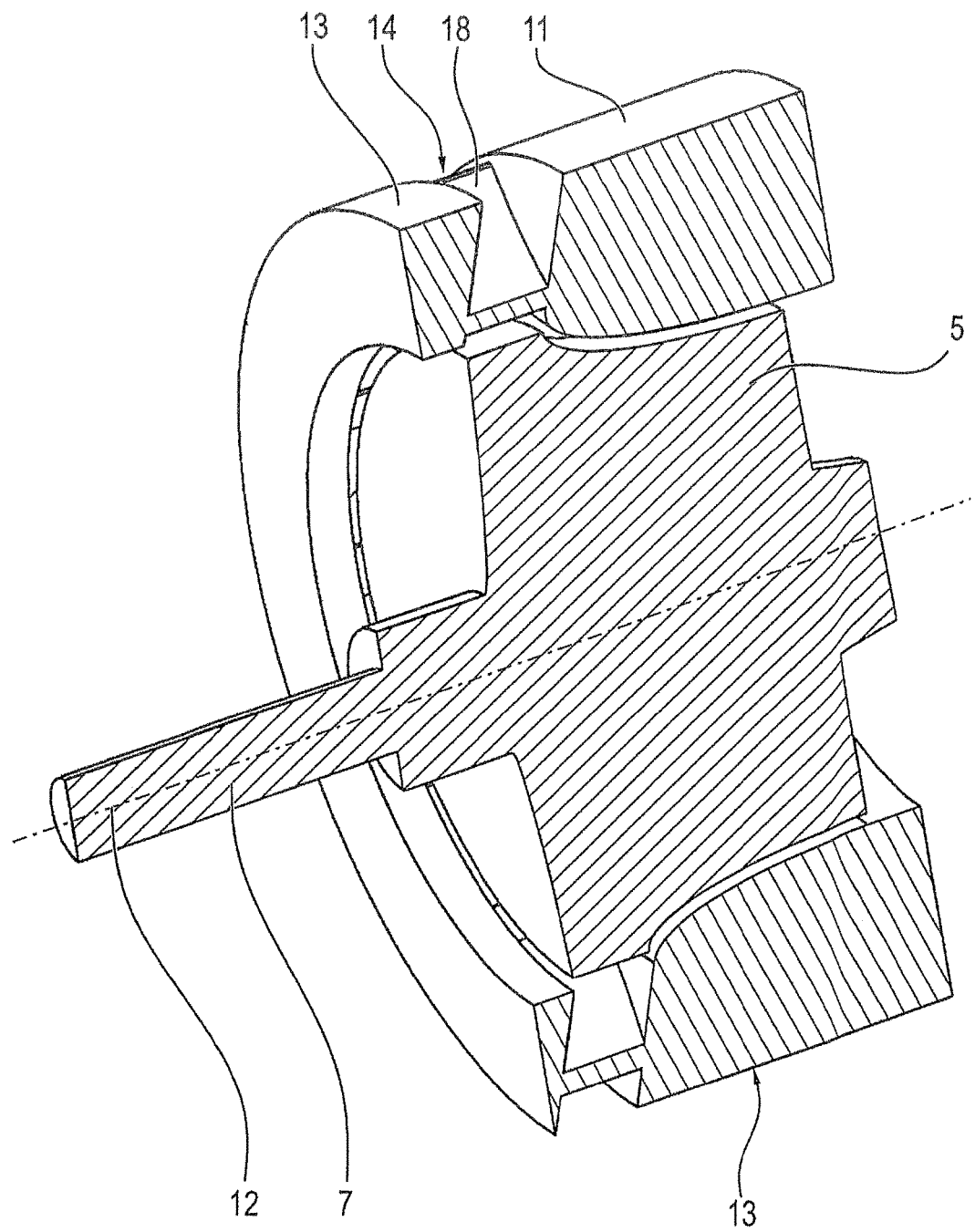

FIGS. 11 to 13 show a schematically simplified depiction of details of the turbine 28 according to the invention as per the second exemplary embodiment.

The sectional view in FIG. 11 shows the arrangement of the drum 11 in the turbine housing 2. A drum length 26 and a turbine wheel length 27 are shown. Here, the two lengths are measured in the direction of the axis 12. The drum length 26 is greater than the turbine wheel length 27. In this way, the turbine wheel 5 is, at its radially outer side, completely surrounded by the drum 11. Furthermore, an inner contour 33 of the drum 11 is designed correspondingly to the outer contour 34 of the turbine wheel 5.

FIG. 12 shows an isometric view of the drum 11. FIG. 13 shows a section parallel to the axis 12. The ends of the aperture 14, or the transition from the aperture 14 to the closure surface 13, are/is in this case shown in schematically simplified form with sharp transitions. It is inherently also possible for smooth transitions to be provided here.

In addition to the above written description of the invention, reference is hereby explicitly made, for additional disclosure thereof, to the diagrammatic illustration of the invention in FIGS. 1 to 13.

LIST OF REFERENCE SYMBOLS

1 Exhaust-gas turbocharger
2 Turbine housing
3 Bearing housing
4 Compressor housing
5 Turbine wheel
6 Compressor wheel
7 Shaft
8 Turbine inlet
9 Turbine outlet
10 Shaft bearing
11 Drum
12 Axis
13 Closure surface
14 Aperture
15 Rotary movement
16 First volute
17 Second volute
18 Guide vane
19 Bearing elements
20 Journal
21 Shell surface
22 Intermediate spaces
23 Bypass (wastegate duct)
24 First spacing
25 Second spacing
26 Drum length
27 Turbine wheel length
28 Turbine
29 Motion link arrangement
30 Actuator
31 Wastegate bore
33 Outer contour
34 Inner contour
35 Wastegate port
36 Pocket
A(v) Inlet cross-sectional area as a function of v
A 100 Inlet cross-sectional area at maximum opening
v Rotational angle of the drum

The invention claimed is:

1. A turbine (28) for an exhaust-gas turbocharger, having:
a turbine housing (2),
a drum (11) arranged in the turbine housing (2) and rotatable about an axis of rotation (12),
a turbine wheel (5) arranged rotatably in the drum (11),
at least first and second volutes (16, 17) formed in the turbine housing (2), wherein a first volute (16) feeds a first sector of the turbine wheel (5) and a second volute (17) feeds a second sector of the turbine wheel, said first and second sectors lying on opposite sides of the turbine wheel, said first and second sectors being axially separated,
at least one first aperture (14), formed in the drum (11), for conducting a gas flow from the first volute (16) to the turbine wheel (5),
at least one second aperture (14), formed in the drum (11), for conducting a gas flow from the second volute (17) to the turbine wheel (5),
wherein the at least one first aperture (14) is axially separated from the at least one second aperture (14),
wherein said first and second apertures (14) lie on opposite sides of said drum (11)
wherein an inlet cross-sectional area (A(v)) of the volutes (16, 17) is variable by changing an angle of rotation (v) of the drum (11) relative to the turbine housing (2), and
wherein the drum (11) is mounted in the turbine housing (2) by way of bearing elements (19).

2. The turbine as claimed in claim 1, wherein guide vanes (18) for guiding the gas flow to the turbine wheel (5) are arranged in the aperture (14).

3. The turbine as claimed in claim 1, wherein an inner contour (34) of the drum (11) is designed correspondingly to an outer contour (33) of the turbine wheel (5).

4. The turbine as claimed in claim 1, wherein an actuator (30) is operatively connected to the drum (11) in order to rotate the latter.

5. The turbine as claimed in claim 1, wherein a pocket (36) is arranged in a turbine housing (2) for accommodating the bearing elements (19).

6. An exhaust-gas turbocharger (1), having a turbine (28) as claimed in claim 1 and a compressor wheel (6), wherein the turbine wheel (5) is connected to the compressor wheel (6) via a shaft (7).

7. A turbine (28) for an exhaust-gas turbocharger, having:
a turbine housing (2),
a drum (11) arranged in the turbine housing (2) and rotatable about an axis of rotation (12),
a turbine wheel (5) arranged rotatably in the drum (11),
at least one volute (16, 17) formed in the turbine housing (2),
at least one aperture (14), formed in the drum (11), for conducting a gas flow from the at least one volute (16, 17) to the turbine wheel (5),
wherein an inlet cross-sectional area (A(v)) of the volute (16, 17) is variable by changing an angle of rotation (v) of the drum (11) relative to the turbine housing (2), and
wherein the drum (11) is mounted in the turbine housing (2) by way of bearing elements (19),
wherein guide vanes (18) for guiding the gas flow to the turbine wheel (5) are arranged in the aperture (14), and
wherein at at least one rotational angle (v) of the drum (11), a bypass duct (23) that issues into a turbine outlet (9) is connected in fluid-conducting fashion, by a spacing (25) between the guide vanes (18), to the volute (16, 17), whereby a bypass is formed.

8. A turbine (28) for an exhaust-gas turbocharger, having:
a turbine housing (2),
a drum (11) arranged in the turbine housing (2) and rotatable about an axis of rotation (12),
a turbine wheel (5) arranged rotatably in the drum (11),
at least one volute (16, 17) formed in the turbine housing (2),
at least one aperture (14), formed in the drum (11), for conducting a gas flow from the at least one volute (16, 17) to the turbine wheel (5),
wherein an inlet cross-sectional area (A(v)) of the volute (16, 17) is variable by changing an angle of rotation (v) of the drum (11) relative to the turbine housing (2), and
wherein the drum (11) is mounted in the turbine housing (2) by way of bearing elements (19), and
wherein an axial wastegate bore (31) is arranged in the drum (11) and wherein, at one rotational angle (v) of the drum (11), the axial wastegate bore (31) is placed in overlap with a wastegate port (35), whereby a bypass is formed.

9. A turbine (28) for an exhaust-gas turbocharger, having:
a turbine housing (2), a drum (11) arranged in the turbine housing (2) and rotatable about an axis of rotation (12), a turbine wheel (5) arranged rotatably in the drum (11), at least one volute (16, 17) formed in the turbine housing (2), at least one aperture (14), formed in the drum (11), for conducting a gas flow from the at least one volute (16, 17) to the turbine wheel (5), wherein an inlet cross-sectional area (A(v)) of the volute (16, 17) is variable by changing an angle of rotation (v) of the drum (11) relative to the turbine housing (2), and wherein the drum (11) is mounted in the turbine housing (2) by way of bearing elements (19), wherein at at least one rotational angle (v) of the drum (11), a bypass duct (23) that issues into a turbine outlet (9) is connected in fluid-conducting fashion, by a spacing (25) between the guide vanes (18), to the volute (16, 17), whereby a bypass is formed, and wherein bypasses at both volutes (16, 17) are formed simultaneously at one rotational angle (v).

10. A turbine (28) for an exhaust-gas turbocharger, having:

a turbine housing (2), a drum (11) arranged in the turbine housing (2) and rotatable about an axis of rotation (12), a turbine wheel (5) arranged rotatably in the drum (11), at least one volute (16, 17) formed in the turbine housing (2), at least one aperture (14), formed in the drum (11), for conducting a gas flow from the at least one volute (16, 17) to the turbine wheel (5), wherein an inlet cross-sectional area (A(v)) of the volute (16, 17) is variable by changing an angle of rotation (v) of the drum (11) relative to the turbine housing (2), and wherein the drum (11) is mounted in the turbine housing (2) by way of bearing elements (19), wherein at at least one rotational angle (v) of the drum (11), a bypass duct (23) that issues into a turbine outlet (9) is connected in fluid-conducting fashion, by a spacing (25) between the guide vanes (18), to the volute (16, 17), whereby a bypass is formed, and wherein a bypass at both volutes (16, 17) is formed only for one of the volutes (16, 17) at a first rotational angle (v) and wherein a bypass is formed for both volutes (16, 17) at a further rotational angle.

* * * * *